3,151,677
LIQUID TO LIQUID HEAT EXCHANGER
Wendell S. Thompson, Los Gatos, and Henry T. Woodward, Los Altos, Calif., assignors to FMC Corporation, San Jose, Calif., a corporation of Delaware
Filed Dec. 1, 1961, Ser. No. 156,421
12 Claims. (Cl. 165—186)

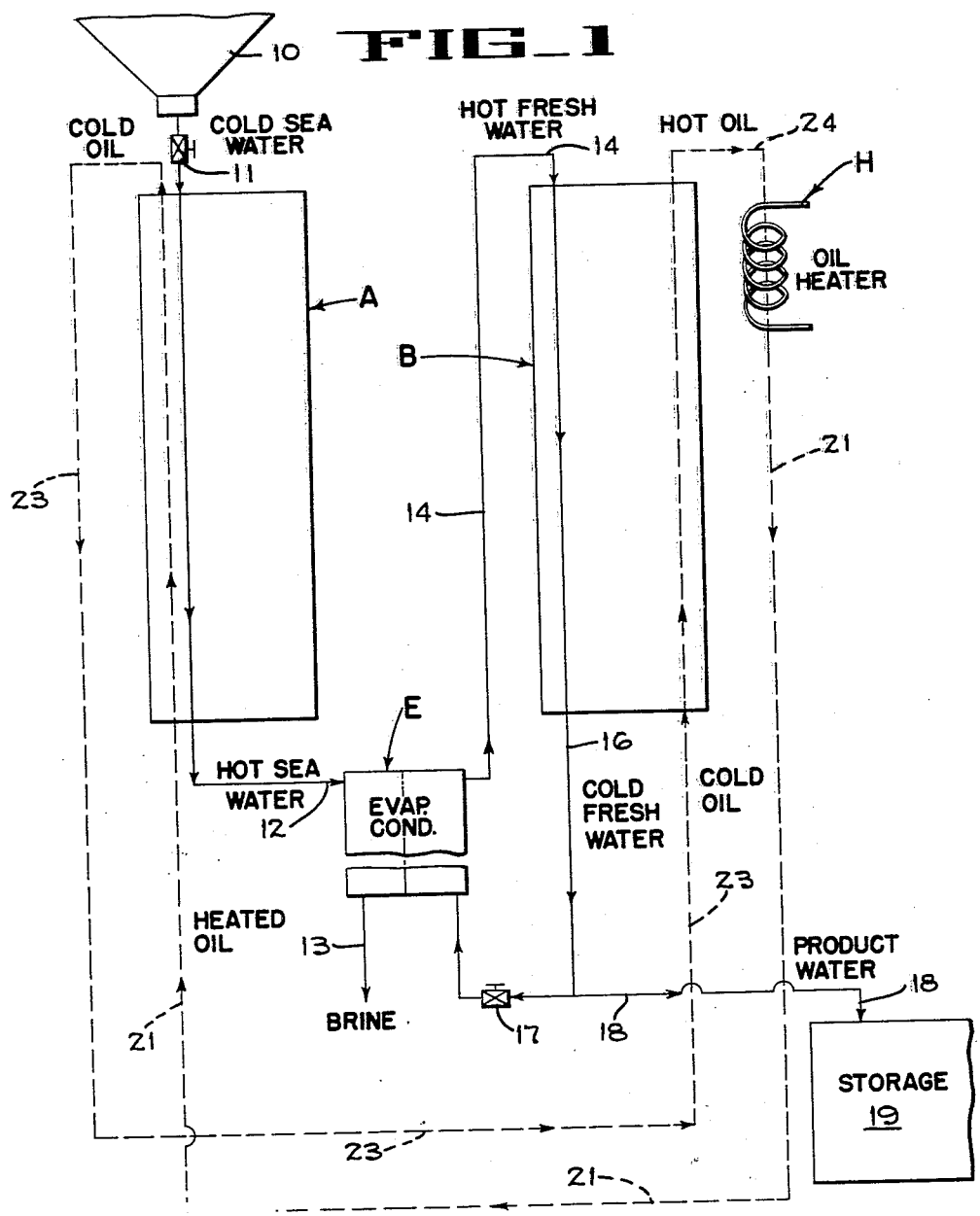

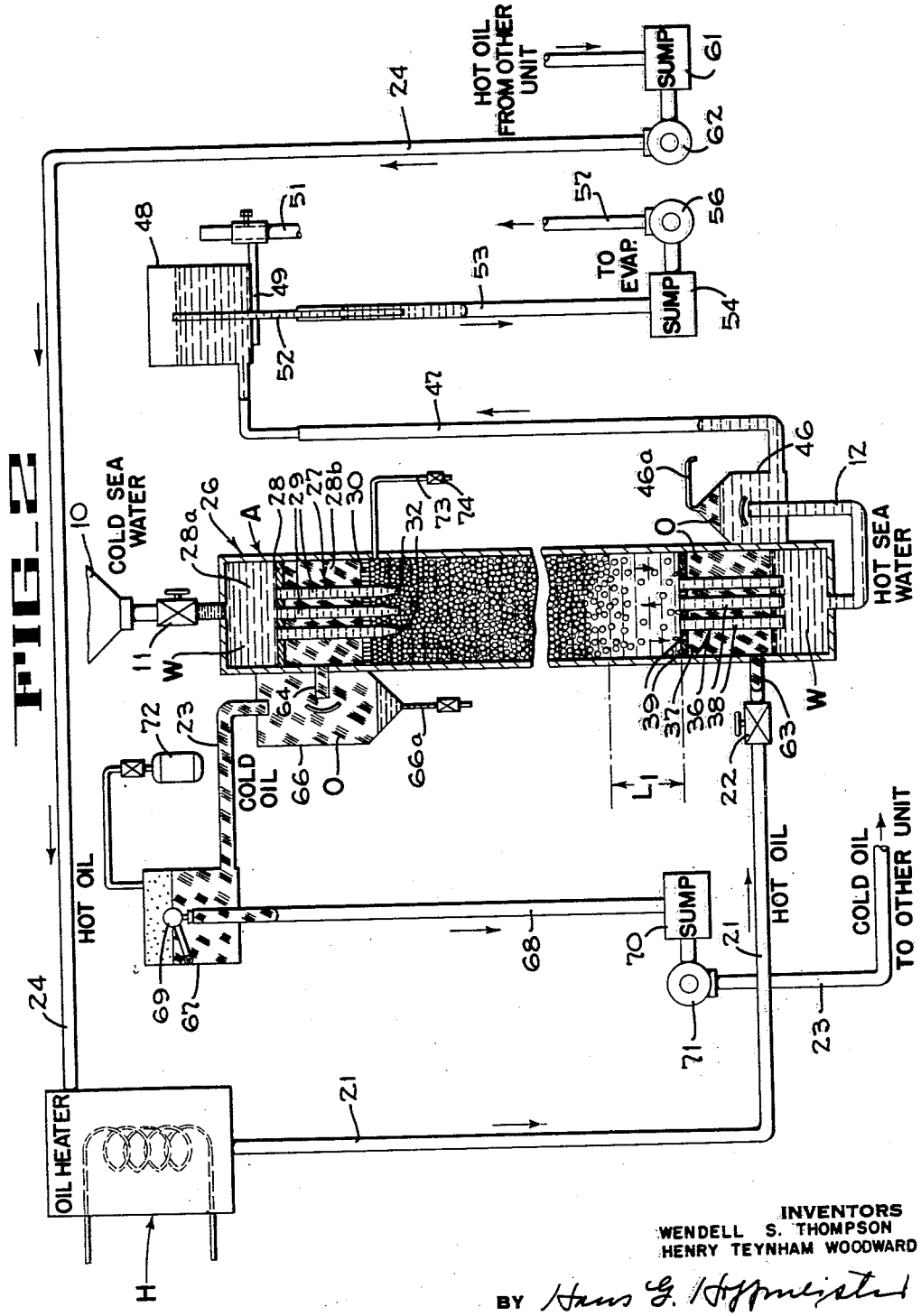

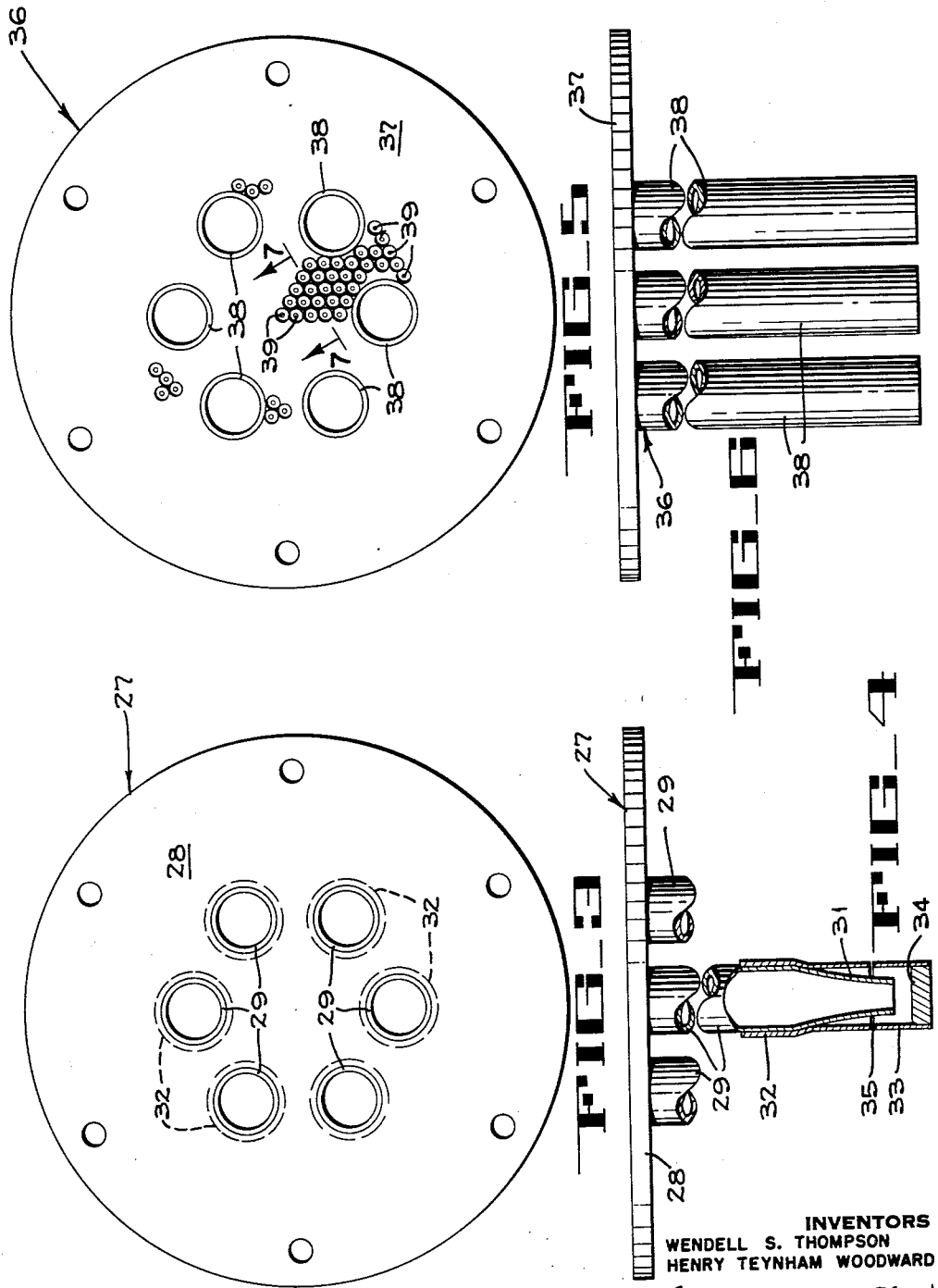

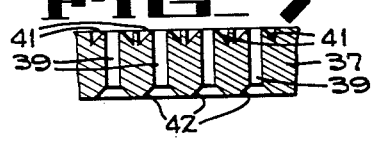
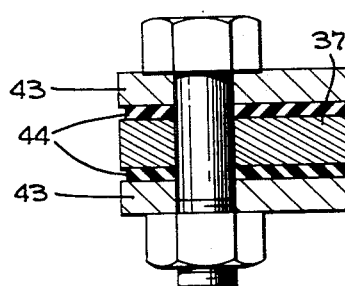
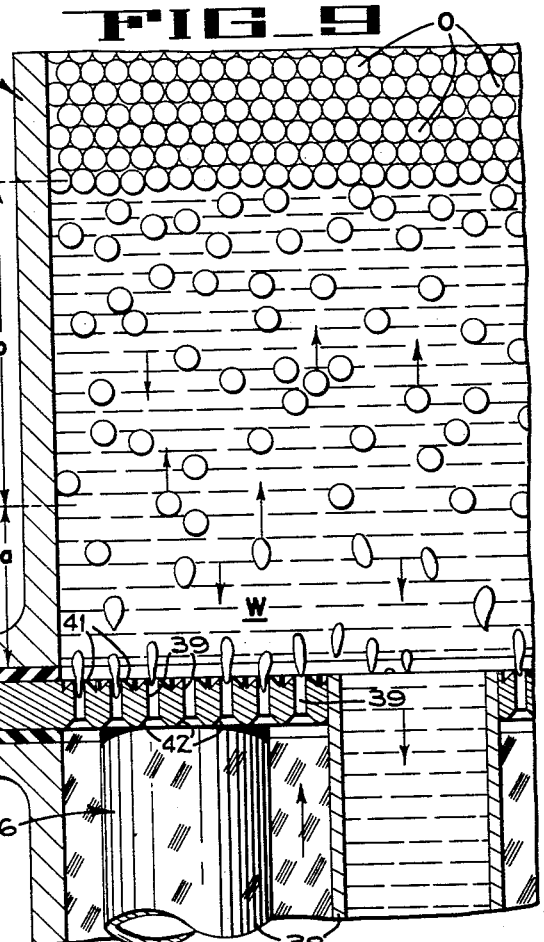
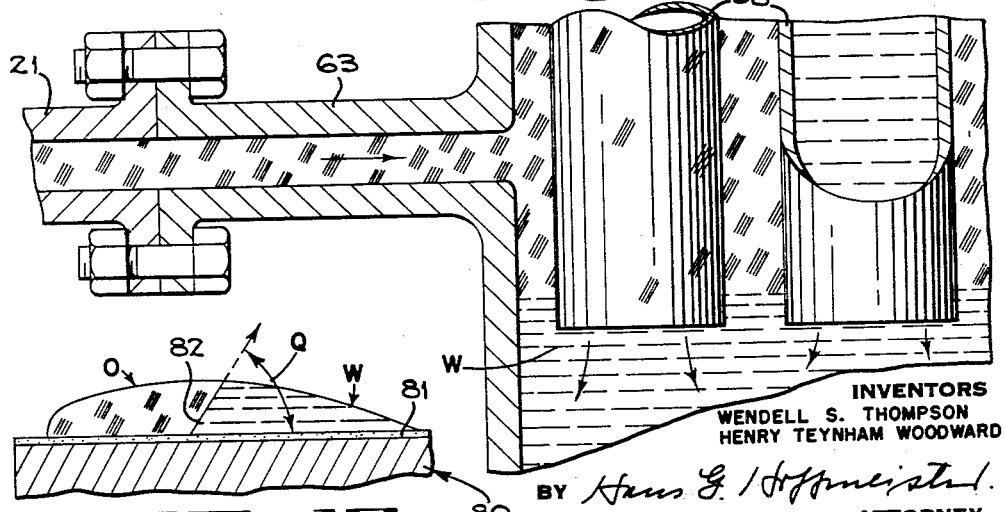
Oct. 6, 1964     W. S. THOMPSON ETAL     3,151,677
LIQUID TO LIQUID HEAT EXCHANGER
Filed Dec. 1, 1961     4 Sheets-Sheet 4
INVENTORS
WENDELL S. THOMPSON
HENRY TEYNHAM WOODWARD
BY Hans G. Hoffmeister
ATTORNEY

United States Patent Office 3,151,677
Patented Oct. 6, 1964

This invention relates to heat exchange and more specifically to apparatus for exchanging heat between immiscible liquids of different densities. Although the application of the heat exchange units of this invention is not limited to any particular service, heat exchange units of this invention will be described in conjunction with a system for converting sea water to fresh water. The heat exchanger of this invention is an improvement in the heat exchanger disclosed and claimed in the co-pending application of H. T. Woodward et al., Serial No. 84,652, filed January 24, 1961, and assigned to the assignee of the present invention.

For example, if the heat exchanger of the present invention were to be used to heat sea water for saline water conversion, the heat exchanger would provide direct contact between the sea water and a heated liquid that is immiscible with water, is not volatile at operating temperatures. Such a liquid will be hereinafter referred to as an oil. In this application of the invention, sea water is admitted at the top of the heat exchange unit and flows downwardly through the unit, forming the continuous phase liquid. Heated oil is admitted near the bottom of the unit and flows upwardly therethrough. Orifice plate means are provided to disperse and break the oil up into droplets. As the droplets rise through the water column, they pack together without coalescing, thereby forming the dispersed phase liquid. This counterflow of liquids results in a transfer of heat from the oil to the sea water in the heat exchange column. The oil is coalesced at the top of the column by a special honeycomb or grid type plate, into a homogenous body of oil. Oil is withdrawn from this homogenous body of coalesced oil at the same rate that it enters the unit.

This system has the advantage that the heat exchange surfaces are constantly renewed, as the water and the oil droplets flow past each other, and there is no problem of removing scale from the active heat exchange surfaces. As described in the foresaid copending application, a duplicate heat exchange unit can be used to heat the oil by means of hot fresh water. If an oil is used which is heavier than water, and if the oil is to remain the dispersed phase liquid, the orifice plate will be near the top of the column and the coalescing plate near the bottom.

An object of the present invention is to facilitate dispersion and breaking up the oil into small, discrete droplets of uniform size, so that the droplets can pack together and provide a dispersed phase liquid of maximum surface. This affords optimum efficiency of the heat transfer action with the continuous phase liquid. Briefly, this object is accomplished by forming the orificed droplet dispersing plate of a material whose surface is preferentially wet by the liquid of the continuous phase (e.g. the water), so that the streamlets of liquid of the dispersed phase (the oil) readily separate from, and do not tend to adhere to the dispersing plate as they pass through the plate orifices. Such a material, which has a stronger affinity for water than for oil, will be called a hydrophilic material. The use of a hydrophilic material for the dispersing plate insures the uniform formation of small discrete droplets of the dispersed phase liquid, or oil.

Still another object of the invention is that of insuring that the droplets of dispersed phase liquid (the oil) completely coalesce after having performed their heat exchange function, so that the oil can be withdrawn from the heat exchanger as a homogenous body, without entrainment of the other liquid. This is accomplished by providing a honeycomb or screen member that coalesces the droplets of dispersed phase liquid (the oil). In the present invention, the coalescing member is formed of a material the surface of which is preferentially wet by the dispersed phase liquid (the oil). This has been found to insure coalescing of the oil droplets into a homogenous body for withdrawal without water entrainment. Such a material, which has a greater affinity for oil than for water will be called a hydrophobic material.

The manner in which these and other objects of the invention may be accomplished will be apparent from the following detailed description of the invention.

In the drawings:
FIGURE 1 is a schematic diagram of a sea water conversion system involving two heat exchange units connected to an evaporator-condenser unit.
FIGURE 2 is a diagram showing one of the heat exchange units and associated equipment.
FIGURE 3 is a plan of the water inlet tube assembly.
FIGURE 4 is a section of the water inlet assembly.
FIGURE 5 is a plan of the oil dispersing inlet plate and water outlet tubes.
FIGURE 6 is a side elevation of the oil dispersing inlet plate and the water outlet tubes.
FIGURE 7 is a section taken on 7—7 of FIG. 5.
FIGURE 8 is a perspective of the coalescing honeycomb structure that coalesces the oil droplets into a homogenous body of oil.
FIGURE 9 is an enlarged fragmentary section through a heat exchange unit, showing the action of the droplets as they are formed and as they pack together.
FIGURE 10 is a diagram illustrating a classical method of determining the preferential wetting characteristics of two liquids and a solid.

Referring to the block diagram of FIG. 1, a sea water conversion system is shown having a water heating heat exchange unit A, and an oil heating heat exchange unit B, each of which embodies the present invention. Cold sea water comes from a tank 10 and is admitted to the unit A under control of a valve 11. The cold sea water flows downwardly through the heat exchanger and picks up heat from the rising droplets of oil. The hot sea water leaves the heat exchange unit A by line 12, and enters a combined evaporator and condenser unit E. Details of the evaporator and condenser unit are not part of the present invention. It need only be said that in the evaporator and condenser unit E, a portion of the hot sea water is evaporated and another portion is drawn off in the form of brine through line 13. The vapor derived from the sea water is condensed and is taken off in the form of hot fresh water by means of line 14, which hot fresh water enters the upper portion of the oil heating heat exchange unit B.

The hot fresh water flows downwardly through the heat exchanger B, and heat is transferred from the water to the oil, cold fresh water leaving the heat exchanger B by means of line 16. Under control of valve 17, a portion of the cold fresh water is admitted to the condenser portion of unit E for condensing the water vapor into fresh water. A portion of the cold fresh water leaving the oil heating heat exchange unit B is conducted by line 18 to a storage tank 19 to form the product fresh water.

In the oil circulating system, heated oil passes through line 21 and enters the lower portion of the water heating heat exchanger A, oil flow being controlled by a valve 22. The drawings illustrate units that employ an oil that is less dense than water. In this case, the oil flows upwardly through the heat exchanger A in the form of droplets, and heat is transferred from the oil to the sea water. The cool oil leaves the heat exchanger A by means of line 23 and is transferred to the lower portion of the oil heating heat exchanger B. In this heat exchanger, the oil again rises in the form of droplets, but here it is heated by the hot fresh water passing downwardly through the exchanger. The hot oil leaves the heat exchanger B by means of a line 24, whereupon the oil passes through an oil heater H, which makes up for heat losses.

As an example of the present invention, the water heating heat exchange unit A and its associated equipment will now be described in detail. This description will also suffice for the oil heating unit B, which is similarly arranged. With the exception of the preferential wetting characteristics of the oil dispersing plates and the oil coalescing members, the apparatus to be described here is more fully described in the aforesaid copending application.

Referring to FIGS. 2–9, and particularly to FIG. 2, the heat exchange unit A and its associated equipment are shown in somewhat diagrammatic form. This is the unit wherein hot oil enters the unit and heats incoming sea water. The heat exchanger comprises a column or vessel 26, and a water inlet and oil separating assembly 27 is provided. This assembly includes means for distributing the incoming water into the oil, and comprises a plate 28 disposed adjacent the upper portion of the vessel. The plate 28 divides the upper portion of the vessel into an inlet chamber 28a for incoming water W, and a zone below the plate which is an inlet zone 28b for the coalesced oil O. Projecting downwardly from plate 28 are water inlet tubes 29 the construction of which appears in FIG. 4. Each tube 29 is necked down at 31 and a sleeve 32 is welded in place over the necked down portion of the tube. The sleeve 31 has an extension 33 that clears the necked down tube portion 31. The bottom of the sleeve is closed by a plate 34 and water outlet slots 35 are formed in the extension 33 of the sleeve 32. This construction provides a restricted outlet for controlled introduction of water into the heat exchange zone and prevents oil from finding its way into the water supply.

As seen in FIG. 2, disposed across an upper portion of the vessel 26, and mounted above the outlet slots of the water tubes 29, is a honeycomb member 30, also seen in perspective in FIG. 8. This member coalesces the oil droplets at the top of the column, as they rise through the member. In accordance with the present invention, the honeycomb member 30, or at least the surface thereof, is formed of a hydrophobic material, that is, a material which is wet preferentially by the droplets of the dispersed liquid, in this case the oil.

There is also a water and oil separation assembly 36 mounted at the lower end of the column. This assembly provides for introduction of the oil into the active portion of the column, and it conducts water from the column past the body of incoming oil. Assembly 36 comprises an orificed oil dispersing plate 37 that supports downwardly extending water outlet tubes 38. Referring to FIGS. 5 to 7, depending upon the material of the plate, the plate 37 is molded, punched or drilled to provide oil distributing orifices 39. For reasons described in the aforesaid copending application, the plate illustrated in these figures is recessed or counter-sunk around the outlet of the orifices 39 to form nozzle like projections 41 at each orifice. The inlets to the orifices 39 are chamfered at 42 to provide for smooth flow entry of oil into the orifices in the plate. Although chamfers 42 and nozzles 41 do facilitate entry and departure of the oil, and hence may be provided where fabrication cost is unimportant, the hydrophilic plate 37 of the present invention renders provision of such elements unnecessary, and hence reduces manufacturing cost.

As seen in FIG. 9, the plate and the tube assembly 36 is mounted between flanges 43 of upper and lower sections of the vessel and sealed by gaskets 44. In the example described, the droplet forming orifices 39 in dispersing plate 37 have a diameter of $\frac{1}{16}$ of an inch. These orifices produce spherical droplets of oil having diameters that are slightly under $\frac{1}{8}$ of an inch.

As previously mentioned, in accordance with the present invention an improved droplet formation action is provided by dispersing plate 37. The plate 37, or at least its surface, is formed of a material that is preferentially wet by the continuous phase liquid, in this case the water. The classical method of indicating and determining the preferential wetting characteristics of two liquids for a solid is shown in the diagram of FIG. 10. Here a small body of water W adjoins a small body of oil O on an aluminum plate 80 having an oxidized surface 81. An interface 82 is formed between the two liquids because they are immiscible. With a plate 80 having the characteristics described, the angle that the interface forms with the plate is an angle Q, and as can be seen in FIG. 10, this angle is acute when measured in the water body W. When angle Q is acute, this indicates that the oxidized aluminum plate is preferentially wet by the liquid which forms the acute angle with the plate, the water in this case. Hence an oxidized aluminum plate acts as a hydrophilic material. The degree of wetting of the plate by the two liquids is actually relative. The smaller the acute angle Q, the greater is the degree of preferential wetting of the plate by the liquid whose interface forms the acute angle with the plate, the water in this case. See Textbook of Physical Chemistry—second edition, by Samuel Glasstone, Van Nostrand, New York, pp. 482–484.

If the dispersing plate material were preferentially wet by the oil (hydrophobic), in operation of the unit a film of oil would form on the upper surface of the plate, and the oil would break loose from the plate in relatively large masses instead of in small, droplet forming streamlets.

In the example given, using an oxidized aluminum plate, and a water-oil combination of liquids, the streamlets rising through the orifices in plate 37, as indicated in FIG. 9, emerge without clinging to the plate surfaces, and without flowing along and forming a layer on the upper surface of the plate. Thus the oil leaves the plate 37 in small, droplet forming streamlets, and this condition of the rising oil facilitates the uniform, rapid breakdown of the oil streamlets into small, discrete, spherical droplets. The streamlets break cleanly from the plate and rise a short distance in the column, as indicated in FIG. 9, before breaking up into droplets.

An oxidized aluminum plate 37 has been described. Other materials for plate 37 may be used. For example, since oxides are hydrophilic, other metals, such as copper alloys that have been surface oxidized can be used as a dispersing plate. For example, Admiralty bronze, Phosphor bronze, aluminum bronze, copper-nickel bronze and copper-nickel-silver alloys will stand up against the action of sea water. The surfaces of these metals will oxidize rendering them hydrophilic. Thus such plates will provide the described droplet forming characteristics.

The ordinary silica glasses, being largely formed of silicon dioxide and other oxides, are excellent materials for purposes of molding dispersion plates of the present invention. They are both hydrophilic and chemically resist attack of oils, water, sea water and other liquids.

Plates molded of kaolin, such as hard porcelain, either glazed or unglazed also contain an oxide of silicon and provide excellent dispersion units. Other ceramics, such as soft porcelain with an oxide glaze can also be employed.

Since the chromium in stainless steels forms a thin layer of oxide on the surface of the steel, stainless steels are also suitable materials for use as dispersion plates. The nickel bearing AISI 300 series of stainless steels also resist salt water attack, and hence give good service as dispersing plates 37, in case the heat exchangers are used in a salt water conversion process. The higher the nickel content the greater the corrosion resistance, but it is contemplated that the AISI 400 series of stainless steels, which contain little or no nickel, can also be employed as dispersing plates, but with a somewhat reduced resistance to corrosion.

It is desirable that the walls of the vessel 26 also be hydrophilic, to prevent buildup of oil films on the walls, with attendant interference with optimum droplet formation. For the smaller units, ordinary glass forms an excellent vessel, and facilitates visual inspection and adjustment of the liquid heads and flow rates. For larger installation, the AISI 300 series of stainless steel can be used for the tank (vessel) walls where corrosion is a problem. In other cases, the AISI 400 series stainless steels will serve and will cost less.

Cast concrete, or concrete lined tanks can also be used in the larger installations, concrete also being a hydrophilic material in water-oil systems.

The honeycomb member 30 provided to coalesce the oil droplets into a body of oil is shown in FIG. 8. The member is formed as a grid or screen, and as illustrated is made up of thin sheet material that forms hexagonal cells. The water inlet tubes 29 extend through the foil, and the foil is held in place on the tubes by rubber O-rings 30a. The face-to-face dimension across the hexagons of the honeycomb unit is approximately ¼ of an inch.

As has been mentioned, the honeycomb member is formed of a material, or has a surface formed of a material, that is preferentially wet by the dispersed phase liquid, the oil in this case. In water-oil applications such materials are termed hydrophobic. With such materials, the oil droplets tend to cling to the honeycombed surfaces as they rise through the honeycomb member, and hence wet the honeycomb to a degree greater than does the water. This preferential wetting action facilitates disintegration of the spherical surface tension films that hold the oil in its droplet phase, and cause complete and effective coalescing of the droplets into a homogenous body of oil. Thus oil can be withdrawn from the vessel, without trapping water in the effluent liquid.

Materals that are preferentially wet by the oil over the wetting action of the water, and hence serve as materials for the honeycomb member, generally have oxide free surfaces. Such materials must be stable and have adequate mechanical strength at the temperatures involved.

For example, a coalescing member formed of bright aluminum operates satisfactorily so long as its surface remains clean and substantially unoxidized. Such members may require cleaning from time to time. Materials which do not oxidize and which are superior to clean aluminum members include the polymerized aliphatic base hydrocarbon plastics, such as polypropylene (olefin hydrocarbon base). Polypropylene has been found to be strongly hydrophobic. Coalescing members formed of polyethylene are also hydrophobic, and can be used within the temperature ranges at which they are solid.

A description of what causes the droplets to disperse, rise in the vessel counter to the flow of water, and pack together will now be briefly described. A more detailed description of the principle of operation appears in the aforesaid copending application. Referring to FIG. 2, as the hot sea water W leaves the heat exchange unit A by means of outlet line 12, the water enters an oil and water separator 46, and trapped oil can be withdrawn through line 46a.

The hot sea water leaves the separator 46 by means of line 47 and enters a liquid level control tank 48. This tank is mounted on a platform 49 that is adjustably carried on a vertical support 51, so that the height of the tank 48 and hence the height of the water level can be controlled. The outlet pipe 52 fixed to the tank makes sliding sealing engagement with a downcoming pipe 53 which leads to the sump 54. There is a similar sliding seal in the incoming water line 47, to accommodate tank adjustment. The hot water is withdrawn from the sump 54 by means of a pump 56 which forces the water to the evaporator unit through a line 57.

Referring to the oil circuit through the heat exchanger unit A, oil that has been heated by the hot fresh water in the heat exchanger B (FIG. 1), enters a sump 61 from which it is pumped by means of a pump 62 and discharged through line 24 to an oil heater tank H. Here the necessary make-up heat is added to the oil, and the oil flows down line 21 and through the oil inlet control valve 22. The hot oil enters the vessel by an oil inlet pipe 63 that is disposed below the droplet forming plate 37 and above the lower ends of the water outlet tubes 38. The incoming body of hot oil O rises through the orifices 39 formed in the plate 37 of the present invention and is formed into droplets. These rise in the vessel, countercurrent to the downwardly flowing water, and near the top of the unit the droplets are coalesced by the honeycomb or coalescing member 30 of the invention, into a body of cold oil. Cold oil is withdrawn from the vessel by means of an outlet port 64 which is disposed below the upper plate 28 and above the coalescing honeycomb member 30. The cold oil enters a separator 66 from which the very small amount of water entrained with the oil separates by gravity through outlet line 66a. Line 23 conducts the oil to a level control tank 67 and the oil flows out of the tank by a downcoming line 68, under control of a float valve 69 that maintains the oil level in the tank 67 at a predetermined height. Line 68 can also be adjustable or flexible to provide for adjustment of the oil head. The cold oil enters the sump 70 and is circulated by means of a pump 71 through line 23 to the other heat exchange unit B (FIG. 1) wherein it is heated by the hot fresh water leaving the evaporator. A source 72 of nitrogen gas is connected to oil tank 67 to exclude air and hence inhibit oxidation of the oil.

Any free scale that is formed in the column tends to rise to the honeycomb coalescing member 30. The slurry of scale and water is withdrawn from this zone by a suitable small bleed line 73 controlled by valve 74.

The various static heads involved in the operation of the heat exchanger unit A, and how they control operation of the unit, are described in detail in the aforesaid copending application. Also, as explained in detail in the application, the flow rates of the oil and water are at equilibrium, so that the oil and water static heads are not affected by fluid flow.

For purposes of this description it need only be said that the height of water tank 48 is adjusted so that the effective static head of the water is sufficient to make the length $L_1$ (FIGS. 2 and 9) where the droplets are being formed and are coming together in closely packed relation, as short as possible, thereby optimizing the length occupied by closely packed drops which is the effective heat exchange length. The length of the column wherein the droplets are closely packed will be referred to as the "hold up" length, and it is along this length that most of the heat transfer takes place. The hold up length or closely packed droplet zone, is between the upper limit of length $L_1$ and the coalescing member 30. In the hold up length, the heat exchange characteristics have been found to approximate closely that which would be expected from closely packed spheres.

The volume of both oil and water flow is determined by the adjustment of valves 22 and 11, whereas the hold up length can be determined by adjustment of the static water head by adjusting tank 48. Alternatively, the static oil head could be adjusted to control the hold up length.

As previously explained, the formation of the oil droplets is indicated diagrammatically in FIG. 9. As the oil rises through the orifices 39 formed in the specially selected dispersing plate 37, it enters the water as a series of elongated streamlets. Because of the preferential wetting characteristics of plate 37 for the continuous phase liquid (the water), the streamlets break clean of the plate. The streamlets soon break into oil droplets under surface tension forces, this occurring over a short distance indicated by length "a" in the Figure. After the oil droplets are formed, they gather together, and eventually become closely packed. This gathering of the droplets occurs over another short distance indicated at "b" in the Figure. The distances "a" and "b" add to form the length $L_1$, previously referred to. The entire packed column of oil droplets slowly rises in the vessel, as described. Although the lengths "a" and "b" are where droplets are forming and packing, are held to a minimum for maximum efficiency, it has been found that such lengths should be present to facilitate the formation of small discrete droplets.

A suitable oil for purposes of the invention when water forms the continuous phase liquid, is a highly refined petroleum base oil. Specifically, an oil that is found to be satisfactory for these purposes is one having a specific gravity of 0.850 at 20° C., a viscosity of 4.2 centistokes at 20° C., and a molecular weight of 195. This oil is less dense than water and hence will rise through the water, and in the system described in detail by forming the dispersing plate and the coalescing member of the materials referred to, these elements will have the correct preferential wetting characteristics.

As previously mentioned, the matter of the relative densities of the two liquids determines which liquid rises and which liquid falls in the column. Thus, if it were desired to operate the system so that the oil is to remain as the dispersed phase liquid, and if an oil is selected that is heavier than water, the flow conditions of the two liquids will be reversed from those illustrated. Under these conditions, the oil dispersing and coalescing member, and their associated tubes and connections will be reversed from the positions illustrated. The oil dispersing plate will be mounted near the upper end of the vessel, with the water outlet tubing extending upwardly therefrom. The oil coalescing member will extend across a lower portion of the vessel, with the water inlet tubing projecting upwardly through the coalescing member. The invention is not limited to the use of oil and water as the heat exchange liquids. In the broader aspects of the invention, the liquids need only be immiscible and of different densities, with the continuous phase liquid preferentially wetting the orifice dispersing plate, and with the dispersed phase (droplet forming) liquid preferentially wetting the droplet coalescing member.

A water-oil system has been described wherein the water has been conducted through the vessel as the continuous phase liquid, and the oil is dispersed. It has also been explained that the position of the parts is determined by the relative densities of the liquids. However, the water could also form the dispersed phase liquid. In this case, the dispersing plate would be formed of a material that is preferentially wet by the continuous phase liquid as before, but in the water-oil system now being described, the continuous phase liquid would be the oil. Thus in this system, the dispersing plate would be formed of a hydrophobic material, instead of being formed of a hydrophilic material as before. In this unit, as in those previously described, the coalescing member would be preferentially wet by the dispersed phase liquid, but such liquid would now be the water. Hence the coalescing member, which must coalesce water droplets, would now be formed of a hydrophilic material, instead of a hydrophobic material as before. Examples of these two types of materials for water-oil units have been previously given, and such materials would also be employed for the dispersing plate and the coalescing member in the water dispersing system, in accordance with the preferential wetting conditions outlined above, and common to all systems.

To summarize, in all of these examples, the dispersing plate is preferentially wet by the continuous phase liquid, and the coalescing member is preferentially wet by the dispersed phase liquid.

It is to be noted that the coalescing member 30 eliminates the need for enlarging the cross sectional area of the vessel above the member in order to provide a dwell time for coalescing the dispersed phase liquid. In the present invention, the cross section area of the vessel can remain the same both above and below the coalescing member.

It has been found that the specially formed dispersing plate of the present invention produces droplets of uniform size. The same is true of the nozzled dispersing plate of the aforesaid copending application. In either case, advantage is taken of the uniformity of droplet size with respect to vessel design. It is apparent that the water velocity through outlet tubes 38 (FIG. 2) must be greater than the velocity of the water in that portion of the vessel that is above the dispersing plate 37, for steady state flow. Thus there is a minimum acceptable droplet size. For a given water velocity, oil droplets that are below this minimum size can be entrained and withdrawn from the column by the water. However, by insuring that all of the oil droplets are the same size, the flow rates can be adjusted so that this size droplet will not be entrained in the water, but will rise in the column as previously described. Thus there is no need to enlarge the cross sectional area of the vessel in the zone of the dispersing plate 37.

In the appended claims, where the term "water" appears, it is intended that such term include sea water and other aqueous solutions.

The invention having thus been described, what is believed to be new and desired to be protected by Letters Patent is:

1. Apparatus for directly transferring heat between the continuous and dispersed phases of immiscible liquids of different densities, said apparatus comprising a heat exchange vessel, a liquid inlet tube for the continuous phase liquid projecting into said vessel adjacent one end thereof, liquid separating and dispersing plate means extending across said vessel adjacent the other end thereof, a liquid outlet tube for the continuous phase liquid extending from said plate means toward said other end of said vessel, a plurality of orifices formed in said plate means, means for admitting the continuous phase liquid to said continuous phase liquid inlet tube, means for withdrawing the continuous phase liquid through said outlet tube, means for admitting the dispersed phase liquid to said vessel at a zone between said plate means and said other end of the vessel, means for withdrawing the dispersed phase liquid from said vessel at a zone adjacent said one end of the vessel, the orifices in said plate means breaking the dispersed phase liquids into streamlets which form discrete droplets, said droplets remaining discrete as the dispersed phase liquid flows through said vessel, and a perforated member extending across said vessel at a zone between said means for withdrawing the dispersed phase liquid and the end of said continuous phase liquid inlet tube, said perforated member coalescing the droplets of the dispersed phase liquid into a homogenous body, the surface of said dispersing plate means being of a material that is preferentially wet by the continuous phase liquid for causing the streamlets of the dispersed phase liquid to readily free themselves from the plate means after passing through the orifices in the plate means.

2. The apparatus of claim 1, wherein said perforated coalescing member is preferentially wet by the dispersed phase liquid to assist in coalescing the latter liquid.

3. The apparatus of claim 1, wherein said dispersed phase liquid is an oil and the continuous phase liquid is water.

4. The apparatus of claim 2, wherein said dispersed phase liquid is an oil and the continuous phase liquid is water.

5. The apparatus of claim 3, wherein the oil is lighter than water.

6. The apparatus of claim 3, wherein the surface of said liquid dispersing plate means comprises an oxide.

7. The apparatus of claim 3, wherein the inner surface of said vessel is formed of a hydrophilic material.

8. The apparatus of claim 3, wherein said liquid dispersing plate means is an oxide bearing ceramic.

9. The apparatus of claim 3, wherein said liquid dispersing plate means is a metal having an oxidized surface resistant to salt water attack.

10. The apparatus of claim 3, wherein said liquid dispersing plate means is a glass.

11. The apparatus of claim 4, wherein said dispersed phase liquid coalescing member is formed of an aliphatic base polymer.

12. The apparatus of claim 4, wherein said dispersed phase liquid coalescing member is formed of a polypropylene polymer.

References Cited in the file of this patent

UNITED STATES PATENTS

| | | |
|---|---|---|
| 2,721,790 | Olney | Oct. 25, 1955 |
| 2,739,713 | Robinson | Mar. 27, 1956 |

FOREIGN PATENTS

| | | |
|---|---|---|
| 479,954 | Germany | Mar. 29, 1925 |